(12) United States Patent  
Nakayama et al.

(10) Patent No.: US 12,410,820 B2  
(45) Date of Patent: Sep. 9, 2025

(54) DRAINAGE DEVICE AND DRAINAGE SYSTEM

(71) Applicant: GEX CORPORATION, Osaka (JP)

(72) Inventors: Hiroyuki Nakayama, Osaka (JP); Okihito Kosuge, Osaka (JP); Yoshiomi Hamano, Osaka (JP)

(73) Assignee: GEX CORPORATION, Osaka (JP)

(*) Notice: Subject to any disclaimer, the term of this patent is extended or adjusted under 35 U.S.C. 154(b) by 87 days.

(21) Appl. No.: 18/569,123

(22) PCT Filed: Mar. 22, 2022

(86) PCT No.: PCT/JP2022/013000  
§ 371 (c)(1),  
(2) Date: Dec. 11, 2023

(87) PCT Pub. No.: WO2023/286372  
PCT Pub. Date: Jan. 19, 2023

(65) Prior Publication Data  
US 2024/0183364 A1 Jun. 6, 2024

(30) Foreign Application Priority Data

Jul. 14, 2021 (JP) .................................. 2021-116122  
Nov. 29, 2021 (JP) .................................. 2021-193180

(51) Int. Cl.  
*F04F 10/02* (2006.01)  
*A01K 63/04* (2006.01)

(52) U.S. Cl.  
CPC ............ *F04F 10/02* (2013.01); *A01K 63/047* (2013.01)

(58) Field of Classification Search  
CPC ..... F04F 10/02; A01K 63/042; A01K 63/045; A01K 63/047; A01K 63/003  
See application file for complete search history.

(56) References Cited

U.S. PATENT DOCUMENTS 6,257,170 B1 * 7/2001 Gundersen ........... A01K 63/003  
                                                 119/245  
7,134,403 B1 * 11/2006 Mihlbauer ........... A01K 63/042  
                                                 119/263  
(Continued)

FOREIGN PATENT DOCUMENTS

JP       06002544 Y2 * 3/1990  
JP         6-2544 Y2    1/1994  
(Continued)

OTHER PUBLICATIONS

English Translation JP-2016086767-A (Year: 2016).*  
(Continued)

*Primary Examiner* — Shafiq Mian  
(74) *Attorney, Agent, or Firm* — Meunier Carlin & Curfman LLC

(57) ABSTRACT

Provided are a drainage device with which the timing of drainage can be controlled; and a drainage system equipped with the same. The drainage device comprises a siphon mechanism that is provided inside a water tank and that constitutes a siphon pipe and a cylindrical part. One end side of the siphon pipe has a first opening part that is open at the top part thereof, and the other end side has a first connection part that is connected to an overflow pipe. The cylindrical part has a second opening part of which the inner diameter is larger than that of the siphon pipe into which the first opening part of the siphon pipe is inserted, and which is open at the bottom part thereof. The second opening part is set at a position lower than the first opening part and a second connection part.

14 Claims, 21 Drawing Sheets

(56) References Cited

U.S. PATENT DOCUMENTS

| | | | |
|---|---|---|---|
| 10,182,536 | B1 | 1/2019 | Andracki et al. |
| 2004/0134844 | A1 | 7/2004 | McGrath |

FOREIGN PATENT DOCUMENTS

| | | | | |
|---|---|---|---|---|
| JP | 8-214726 | A | | 8/1996 |
| JP | 2002095381 | A | | 9/2000 |
| JP | 2005-87118 | A | | 4/2005 |
| JP | 2005087118 | A | * | 4/2005 |
| JP | 2016-86767 | A | | 5/2016 |
| JP | 2016086767 | A | * | 5/2016 |
| KR | 101871795 | B1 | * | 6/2018 ................ C02F 3/10 |

OTHER PUBLICATIONS

English Translation JP-2005087118-A (Year: 2005).*
English Translation KR-101871795-B1 (Year: 2018).*
English Translation JP 06002544 Y2 (Year: 1992).*
How to: Silence your Aquarium Overfloor; Stockman Standpipe; [online]; Mad Hatter's Reef (YouTube Channel); May 19, 2012 (retrieved Apr. 18, 2022); Internet [https://www.youtube.com/watch?v=NqROZsSBAAU] 0:00 to 6:31.
PCT Application No. PCT/JP2022/013000; International Search Report issued May 10, 2022, 3 pages.
EESR issued in EP22841722.6 on Nov. 7, 2025, 15 pages.

\* cited by examiner

DRAINAGE DEVICE AND DRAINAGE SYSTEM

TECHNICAL FIELD

The present invention relates to a drainage device provided inside a water tank and including a siphon mechanism formed of an inner cylinder and an outer cylinder, and a drainage system provided with the drainage device.

BACKGROUND ART

Furniture in which a large number of water tanks are arranged is installed in a store such as a pet shop in order to sell aquarium fish and the like. Many aquarium fish living bodies and water-weed are stored in the water tank, and breeding water is deteriorated faster than that in a water tank environment of general breeders. In addition, water replacement for physically removing nutrient salts such as ammonia discharged from the living bodies is a work required for managing the living bodies healthily.

In this manner, since the water in the water tank becomes dirty as time elapses, it is required to drain water and supply new water. As a drainage device for draining water in the water tank, there is a drainage device using a siphon mechanism disclosed in Patent Document 1 mentioned below.

The drainage device is formed of an inner cylinder and an outer cylinder. The inner cylinder opens to a water surface and drains overflowed water. The outer cylinder is inserted with a gap from an upper portion of the inner cylinder, and a hole for stopping a siphon action is formed on a side surface thereof. An upper surface of the outer cylinder is provided with a small hole for both air ventilation and air intake. When the inner cylinder performs drainage completely under the water surface, the siphon action acts in the gap between the outer cylinder and the inner cylinder. Note that, a hole diameter is such that the siphon action does not stop although air is sucked from the small hole.

PRIOR ART DOCUMENT

Patent Document

Patent Document 1: JP-U-6-2544

SUMMARY OF THE INVENTION

Problems to be Solved by the Invention

In the siphon mechanism in Patent Document 1, a small hole is merely formed in an upper portion of an outer cylinder, and a timing of starting drainage cannot be controlled. For example, it is preferable to be able to start a drainage operation when a person who manages the water tank considers it appropriate.

The present invention has been achieved in view of the above circumstances, and an object thereof is to provide a drainage device and a drainage system capable of controlling a timing of drainage.

Means for Solving the Problems

To solve the problems described above, a drainage device according to the present invention is that provided inside a water tank, and including a siphon mechanism formed of a siphon pipe and a cylindrical portion, the drainage device comprising:

the siphon pipe including a first opening an upper portion of which is opened on one end side, and including a first connection portion connected to an overflow pipe on the other end side; and the cylindrical portion having an inner diameter larger than the siphon pipe, and having a second opening a lower portion of which is opened and into which the first opening of the siphon pipe is inserted, the second opening set in a position lower than the first opening, wherein a second connection portion for selectively connecting an inside of the cylindrical portion to an air supply unit or atmosphere is provided on an upper surface of the cylindrical portion.

Actions and effects of the drainage device having such a configuration will be described. According to this configuration, the siphon mechanism is formed of a siphon pipe and a cylindrical portion. An inner diameter of the cylindrical portion is larger than the siphon pipe, and a gap having a predetermined size is formed between the cylindrical portion and the siphon pipe. When drainage is performed, water in a water tank enters the cylindrical portion via the gap by a siphon action. Furthermore, water entering from a first opening of the siphon pipe flows into an overflow pipe via a first connection portion to be drained.

Here, a second connection portion is provided on an upper surface of the cylindrical portion, and is selectively connected to the air supply unit or the atmosphere. In a state in which air is fed into the cylindrical portion by the air supply unit, the siphon action does not work, and water is not discharged. When the cylindrical portion is connected to the atmosphere, the air inside the cylindrical portion is released to the atmosphere, and drainage by the siphon action is performed. Therefore, it is possible to control a timing of drainage by controlling whether to connect to the air supply unit or to the atmosphere.

The siphon pipe according to the present invention is preferably formed into a shape of a U-shaped pipe. As a result, a length of a pipe line as the siphon pipe can be secured, and a connection site with the overflow pipe can also be provided at an appropriate position.

A drainage system according to the present invention includes:

the drainage device according to the present invention;
the air supply unit;
a first flow channel that connects the air supply unit to the second connection portion via a first valve body;
a second flow channel that connects atmosphere to the second connection portion via a second valve body; and
a control unit that controls the air supply unit, the first valve body, and the second valve body.

An action and effect of the drainage system with such a configuration are as follows. In order to control a drainage operation by the siphon mechanism that forms the drainage device, the air supply unit, the first valve body, and the second valve body are provided to be controlled by the control unit. By controlling these elements, air can be fed into the cylindrical portion of the siphon mechanism, and air in the cylindrical portion can be discharged. This makes it possible to control a timing of drainage.

According to the present invention, preferably, in a state in which a drainage operation is not performed, the control unit opens the first valve body and closes the second valve body, and allows air to flow in to a position of the second opening inside the cylindrical portion by the air supply unit.

Since the air is allowed to flow in to a position of a second opening inside the cylindrical portion, water does not enter a gap between the cylindrical portion and the siphon pipe. Therefore, no siphon action is performed, and water is not discharged.

According to the present invention, preferably, in a state in which the drainage operation is performed, the control unit closes the first valve body, opens the second valve body, and releases the air inside the cylindrical portion to the atmosphere to allow the siphon mechanism to perform drainage.

By releasing the air inside the cylindrical portion to the atmosphere, water enters the gap between the cylindrical portion and the siphon pipe, and the siphon action is started. As a result, the water in the water tank enters the siphon pipe and flows into the overflow pipe. When a water surface in the water tank is lowered to a height of the first opening of the siphon pipe, the drainage operation is finished.

According to the present invention, preferably, in a state in which the drainage operation is performed, the control unit closes the first valve body, opens the second valve body, releases the air inside the cylindrical portion to the atmosphere, and then closes the second valve body again to allow the siphon mechanism to perform drainage.

As a result, an entire inside of the cylindrical portion and the first opening are put into a communication state in which water is connected. As a result, the water in the water tank enters the siphon pipe and flows into the overflow pipe. When a water surface in the water tank is lowered to a height of the second opening of the cylindrical portion, the drainage operation is finished.

In order to solve the above-described problem, a drainage system according to the present invention includes:
- a drainage device provided inside a water tank, and including a siphon mechanism formed of a siphon pipe and a cylindrical portion;
- a second connection portion for selectively connecting the siphon mechanism to the air supply unit or atmosphere;
- an operation unit for instructing the drainage device to start drainage;
- a first flow channel that connects the air supply unit to the second connection portion via a first valve body;
- a second flow channel that connects atmosphere to the second connection portion via a second valve body; and
- a control unit that controls the first valve body and the second valve body,
- in which the control unit closes the first valve body and opens the second valve body to operate the siphon mechanism to start a drainage operation based on an instruction by the operation unit, and
- closes the second valve body and opens the first valve body after a lapse of a first predetermined time to finish the drainage operation.

Actions and effects of the drainage system having such a configuration will be described. According to this configuration, the siphon mechanism as the drainage device is formed of a siphon pipe and a cylindrical portion. A second connection portion for selectively connecting the siphon mechanism to the air supply unit or the atmosphere is provided. In a state in which air is fed into the cylindrical portion by the air supply unit, the siphon action does not work, and water is not discharged. When the cylindrical portion is connected to the atmosphere, the air inside the cylindrical portion is released to the atmosphere, and drainage by the siphon action is performed. Therefore, it is possible to control a timing of drainage by controlling whether to connect to the air supply unit or to the atmosphere.

In order to control the drainage operation by the siphon mechanism, the first valve body, and the second valve body are provided to be controlled by the control unit. By controlling these elements, air can be fed into the cylindrical portion of the siphon mechanism, and air in the cylindrical portion can be discharged. This makes it possible to control a timing of drainage.

The control unit closes the first valve body and opens the second valve body to operate the siphon mechanism to start the drainage operation based on an instruction by the operation unit. Here, the closure of the first valve body and the opening of the second valve body may be performed simultaneously or in time series. The drainage operation is finished by closing the second valve body and opening the first valve body after a lapse of a first predetermined time. The first predetermined time can be set in advance. The closure of the second valve body and the opening of the first valve body may be performed simultaneously or in time series. Since the control by a timer is performed in this manner, the start and end of drainage can be automatically performed without using a sensor.

Another drainage system according to the present invention includes:
- a drainage device provided inside a water tank, and including a siphon mechanism formed of a siphon pipe and a cylindrical portion;
- a second connection portion for selectively connecting the siphon mechanism to the air supply unit or atmosphere;
- an operation unit for instructing the drainage device to start drainage;
- a first flow channel that connects the air supply unit to the second connection portion via a first valve body;
- a second flow channel that connects atmosphere to the second connection portion via a second valve body; and
- a control unit that controls the first valve body and the second valve body,
- wherein the control unit closes the first valve body and opens the second valve body to operate the siphon mechanism to start a drainage operation based on an instruction by the operation unit, and
- closes the second valve body after a lapse of a second predetermined time and opens the first valve body after a lapse of a third predetermined time after the closure to finish the drainage operation.

According to such a configuration, the control unit closes the first valve body and opens the second valve body to operate the siphon mechanism to start the drainage operation based on an instruction by the operation unit. Here, the closure of the first valve body and the opening of the second valve body may be performed simultaneously or in time series. The drainage operation is finished by closing the second valve body after a lapse of a second predetermined time and opening the first valve body after a lapse of a third predetermined time after the closure. In this manner, a drainage level can be changed by intentionally shifting the closure of the second valve body and the opening of the first valve body. Since the control by a timer is performed in this manner, the start and end of drainage can be automatically performed without using a sensor.

Preferably the control unit according to the present invention opens a water supply valve body for starting water supply to the water tank after the drainage operation is finished.

As a result, water supply can be automatically performed timely, and labor of a worker can be reduced.

Preferably the control unit according to the present invention closes the water supply valve body after a lapse of a fourth predetermined time after the water supply is started.

As a result, water supply can be automatically stopped timely, and labor of a worker can be reduced.

According to the present invention, preferably, a plurality of water tanks is installed, and a selection unit capable of selecting a water tank in which the drainage operation is started is provided.

As a result, it is possible to select a water tank requiring the drainage work, and to efficiently perform the drainage work. Note that, a group of (a plurality of) water tanks may be selected or they may be individually selected.

Preferably the control unit according to the present invention controls a water storage tank valve body that stores water in a water storage tank for supplying water to the water tank, and opens the water storage tank valve body along with the closure of the water supply valve body, and closes the water storage tank valve body after a lapse of a fifth predetermined time.

When the water supply to the water tank is completed, it is required to store water in the water storage tank in preparation for the next water supply, but by controlling the opening and closure of the water storage tank valve body, the water storage can be automatically performed.

BRIEF DESCRIPTION OF THE DRAWINGS

FIG. 4A is a control block diagram of the drainage system in a single filtration system.

MODE FOR CARRYING OUT THE INVENTION

Figure 1:
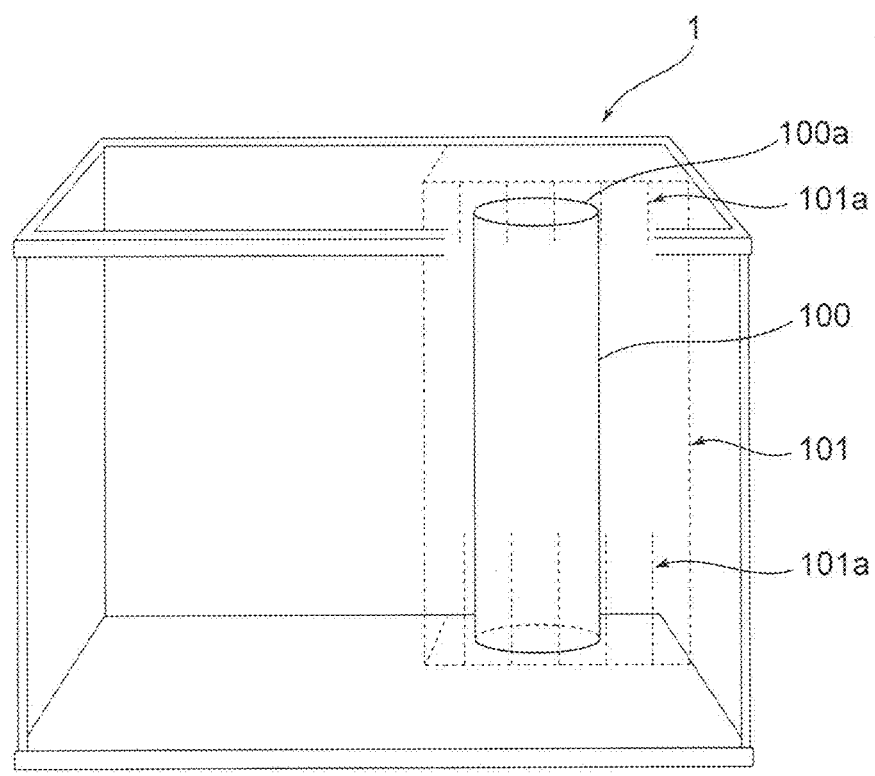
FIG. 1 is a drainage device used in a water tank according to a conventional technology.

FIG. 1 is a schematic diagram illustrating a configuration of a drainage device according to a conventional technology that does not use a siphon mechanism. An overflow pipe 100 and a partition plate 101 (indicated by a broken line) are provided inside a water tank 1. The overflow pipe 100 is provided with an opening 100a at an upper end thereof, and is configured to cause an overflow when water is to be put beyond the upper end so that the water flows into the overflow pipe 101.

The partition plate 101 has an L shape in plan view, and surrounds a corner of the water tank 1 to prevent aquarium fish from approaching the periphery of the overflow pipe 100. As a result, the aquarium fish are prevented from being caught at the time of drainage. A plurality of slits 101a is formed in an upper portion and a lower portion of the partition plate 101 so that water in the water tank can pass therethrough.

When the drainage is performed to replace the water in the water tank 1, the overflow pipe 100 is manually lifted. Accordingly, the drainage is performed from a bottom surface of the water tank 1. Although not illustrated, a connection pipe having a diameter larger than that of the overflow pipe 100 is detachably attached to a lower portion of the overflow pipe 100, and the water in the water tank is drained via the connection pipe when the overflow pipe 100 is lifted.

Configuration of Siphon Mechanism

Figure 2:
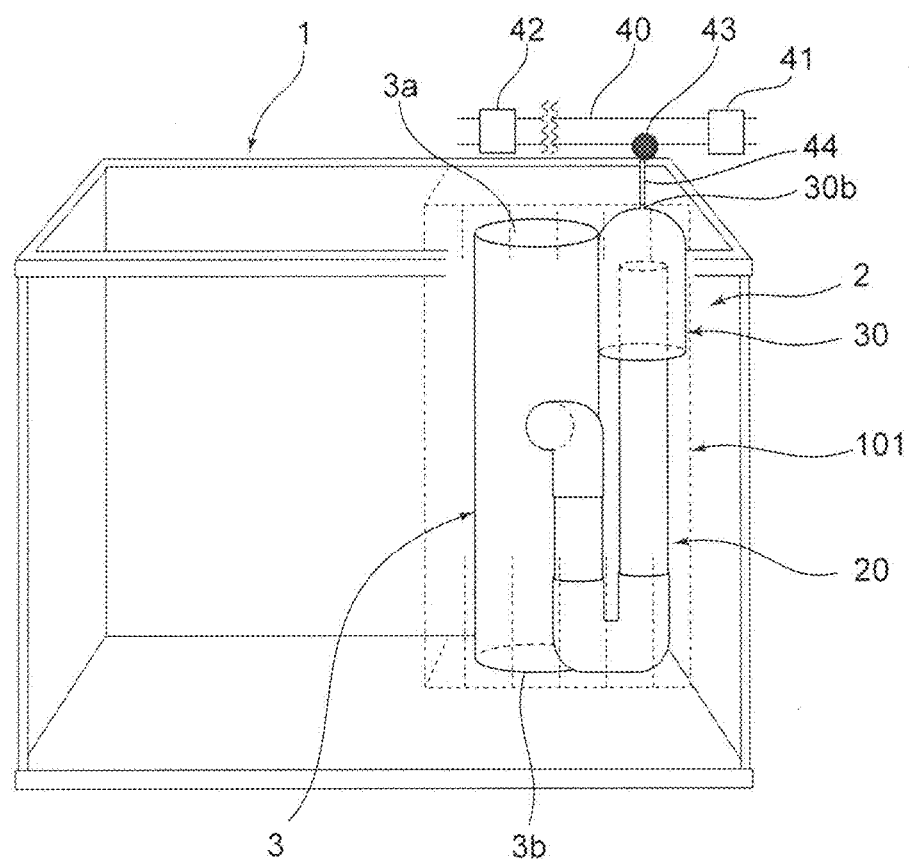
FIG. 2 is a drainage device used in a water tank according to the present embodiment.
Figure 6:
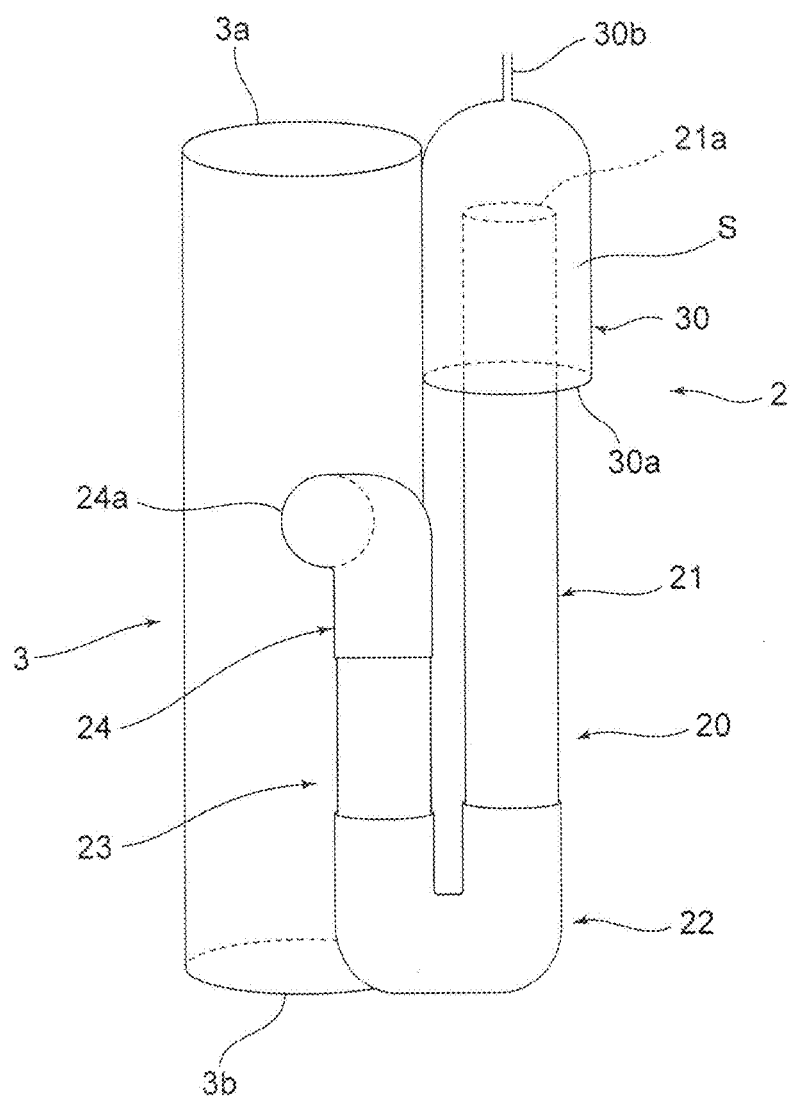
FIG. 6 is a schematic perspective view illustrating only a siphon mechanism.
Figure 7:
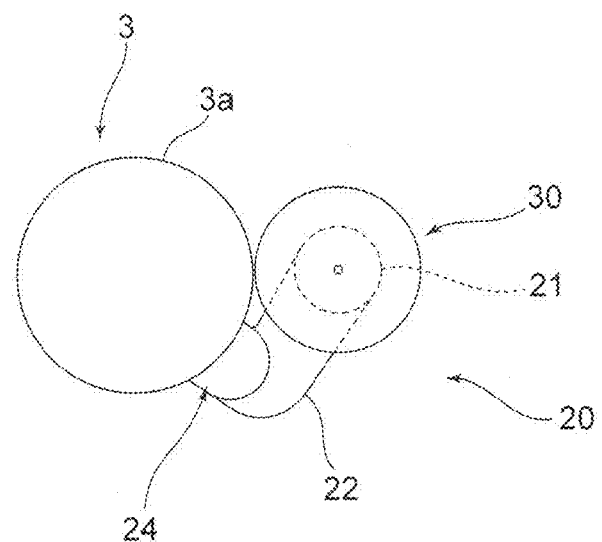
FIG. 7 is a plan view of the siphon mechanism illustrated in FIG. 6.

FIG. 2 is a schematic diagram illustrating a configuration of a drainage device according to the present embodiment. A configuration of a partition plate 101 is the same as that described with reference to FIG. 1. The drainage device includes a siphon mechanism 2. The siphon mechanism 2 is formed of a siphon pipe 20 and a cylindrical portion 30. The siphon pipe 20 is connected to an overflow pipe 3. FIG. 6 is a schematic perspective view illustrating only the siphon mechanism 2. FIG. 7 is a plan view of the siphon mechanism 2 illustrated in FIG. 6.

The siphon pipe 20 has a shape of a U-shaped pipe as a whole. The siphon pipe 20 is formed of a first vertical pipe portion 21, a U-shaped pipe portion 22, a second vertical pipe portion 23, and a connection pipe portion 24. Note that, a shape of the siphon pipe 20 and the number of pipe portions that form the same can be appropriately selected. The first vertical pipe portion 21, the U-shaped pipe portion 22, the second vertical pipe portion 23, and the connection pipe portion 24 are preferably formed of an appropriate material such as glass or resin, and as for connection between the pipes, the first vertical pipe portion 21, the U-shaped pipe portion 22, and the second vertical pipe portion 23 in FIG. 6 are preferably detachable in such a manner that cleaning of clogging and the like may be performed.

The first vertical pipe portion 21 includes a first opening 21a an upper end of which is opened. Two opened upper ends of the U-shaped pipe portion 22 are connected to a lower end of the first vertical pipe portion 21 and a lower end of the second vertical pipe portion 23, respectively. The second vertical pipe portion 23 includes the lower end connected to one of the upper ends of the U-shaped pipe portion 22 and an upper end connected to a lower end of the connection pipe portion 24. The connection pipe portion 24 has an inverted L shape, and includes the lower end connected to the upper end of the second vertical pipe portion 23, and an end (first connection portion 24a) in a horizontal direction connected to the vicinity of the central portion of the overflow pipe 3. The overflow pipe 3 is installed vertically, and includes an opened opening 3a formed at un upper end and an opened opening 3b formed at a lower end. It is configured to cause an overflow when water is to be put beyond the upper end of the overflow pipe 3 so that the water flows into the overflow pipe 3. That is, the overflow pipe 3 has a cylindrical shape. There is a case where a living body bag is floated in the water tank 1 for a predetermined time in order to adjust water temperature and a water quality when a living body arrives. At that time, providing the overflow pipe 3 prevents water from overflowing from the water tank 1. When the living body arrives, the water is drained from the overflow pipe 3, and a siphon action does not start unlike the structure in Patent Document 1. That is, unintended drainage by the siphon pipe does not start when the living body arrives.

The cylindrical portion 30 includes a second opening 30a formed at a lower end thereof so that the first opening 21a of the first vertical pipe portion 21 of the siphon pipe 20 is inserted therein. An inner diameter of the cylindrical portion 30 is set to be larger than an outer diameter of the first vertical pipe portion 21. As a result, a gap S is formed between the cylindrical portion 30 and the siphon pipe 20. The second opening 30a is set to be located in a position lower than the first opening 21a.

An upper portion of the cylindrical portion 30 is formed into a hemispherical shape to be closed, and a second connection portion 30b is provided at the central portion thereof. As it will be described later in detail, air flows in and out via the second connection portion 30b.

Configuration of Drainage System

Figure 3:
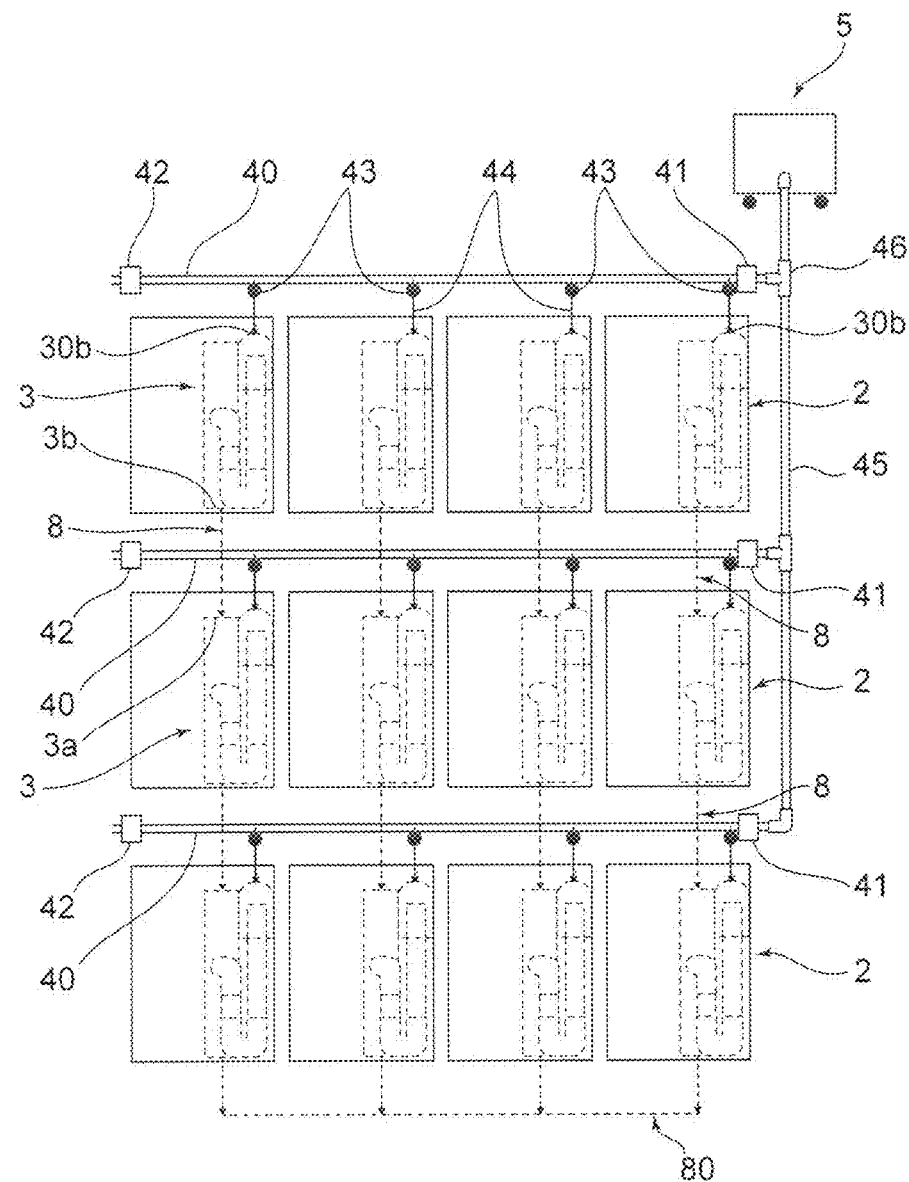
FIG. 3 is a schematic diagram illustrating a configuration of a drainage system (furniture) according to the present embodiment.
Figure 4:
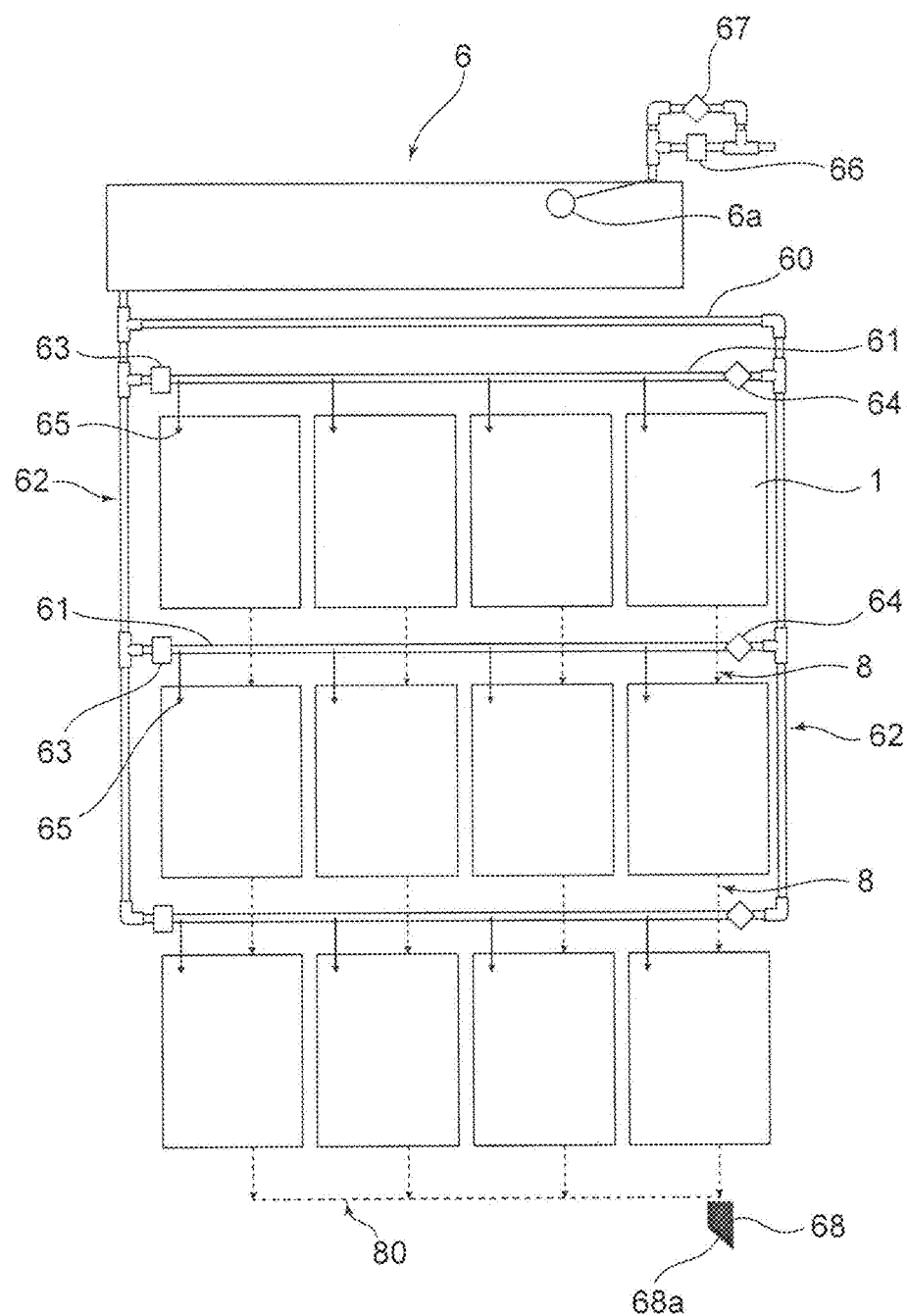
FIG. 4 is a schematic diagram illustrating a first embodiment of a water supply system used in the furniture in FIG. 3.
Figure 4:
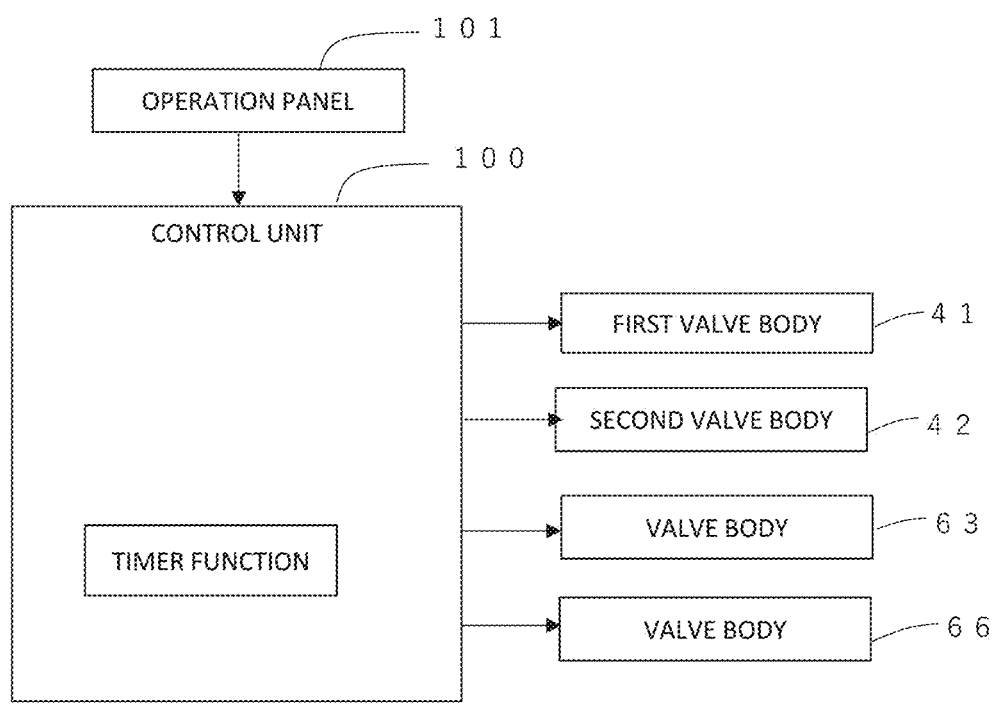
Figure 5:
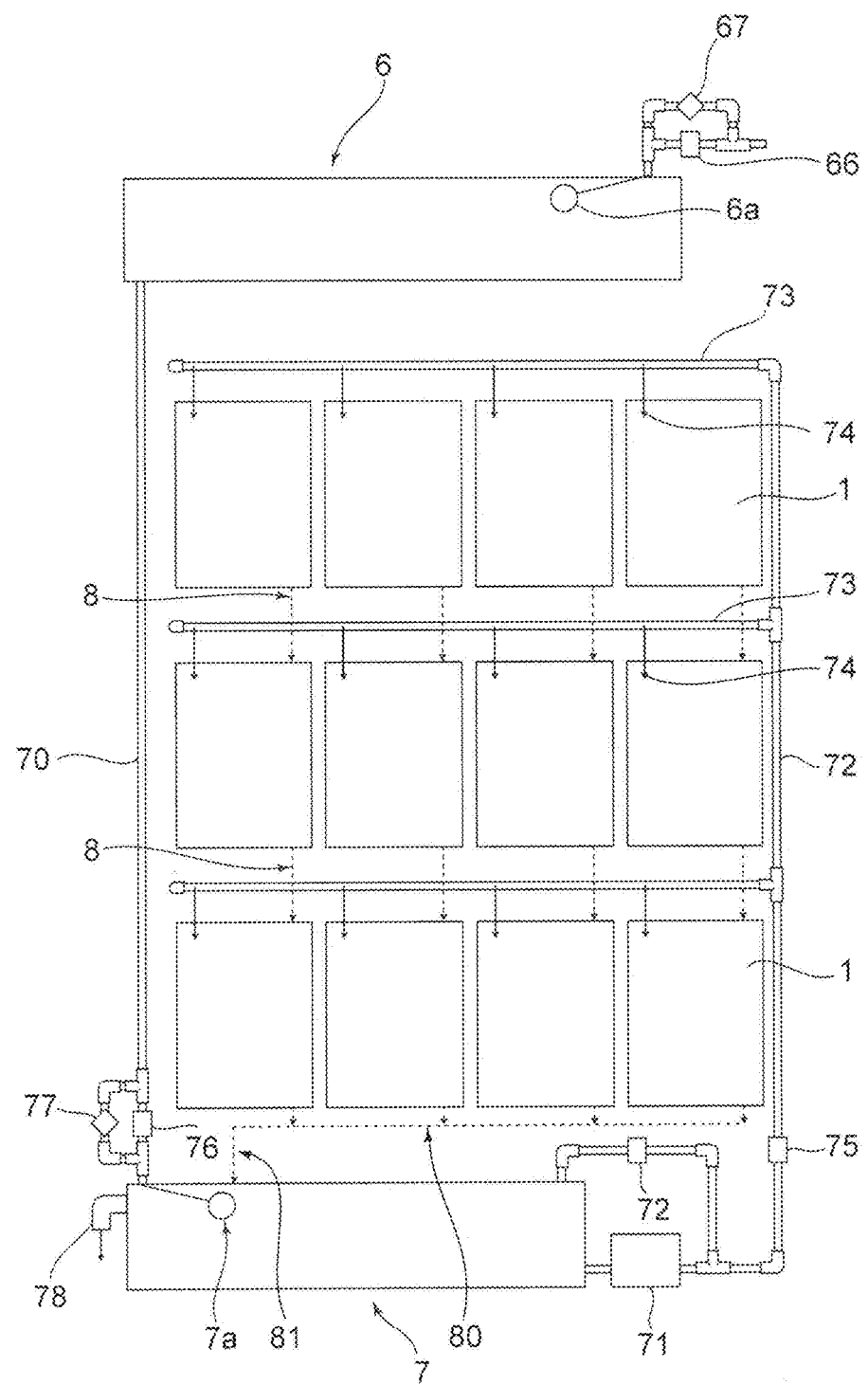
FIG. 5 is a schematic diagram illustrating a second embodiment of a water supply system used in the furniture in FIG. 3.

Next, a configuration of a drainage system according to the present invention will be described. FIG. 3 is a schematic diagram illustrating an outline of a drainage system provided in living body furniture. For convenience of description, elements not related to the drainage system are omitted. FIG. 4 is a schematic diagram illustrating a configuration of a first embodiment of a water supply system used in the furniture. For convenience of description, other elements are omitted. FIG. 5 is a schematic diagram illustrating a configuration of a second embodiment of a water supply system used in the furniture. For convenience of description, other elements are omitted. Any embodiment may be adopted as the present invention.

Figure 5A:
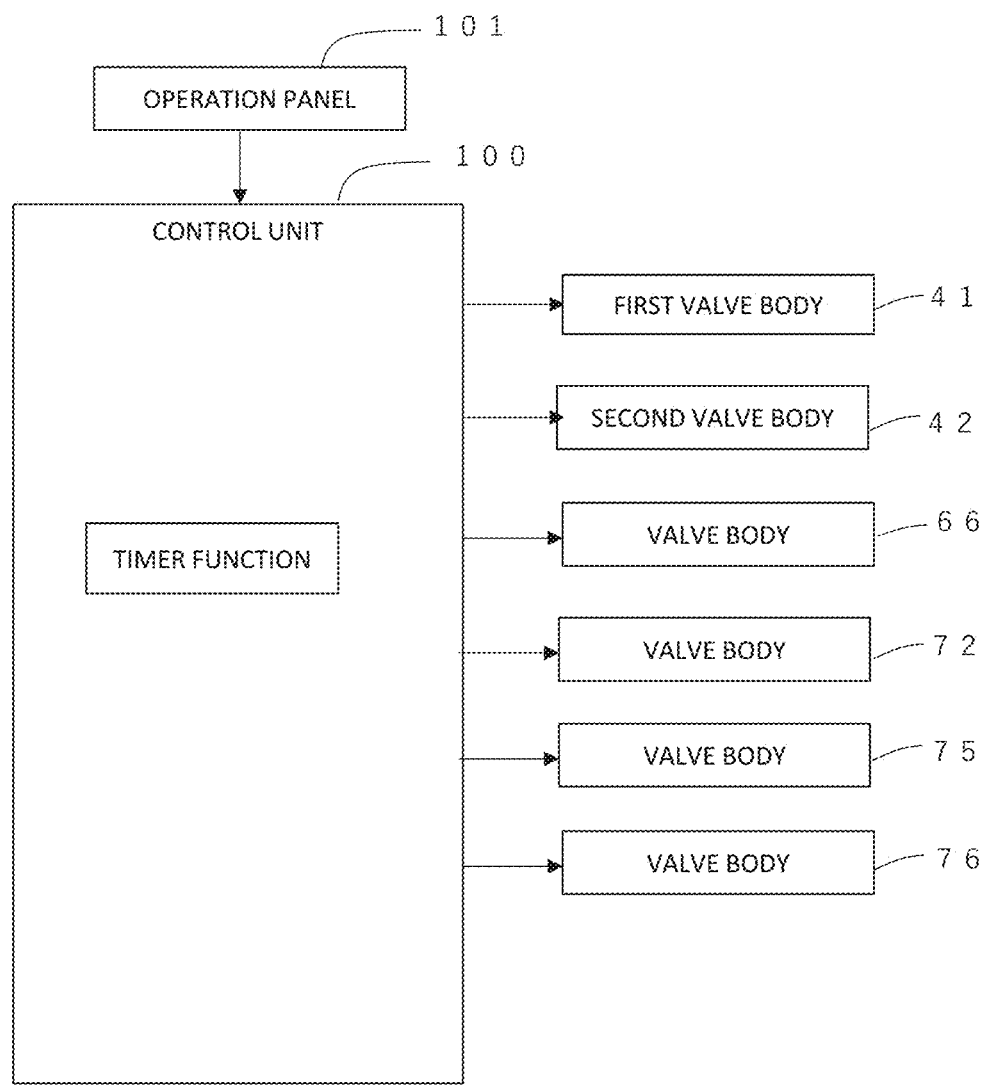
FIG. 5A is a control block diagram of the drainage system in a centralized filtration system.

FIG. 4A is a control block diagram of the drainage system in FIGS. 3 and 4 (single filtration system). FIG. 5A is a control block diagram of the drainage system in FIGS. 3 and 5 (concentrated filtration system).

As illustrated in FIG. 3, in the furniture installed in a store or the like, a large number of water tanks 1 are arranged in a display shelf not illustrated. In the present embodiment, four water tanks 1 are installed on each stage, and a total of 12 water tanks 1 are installed in the display shelf including a total of three stages (upper stage, middle stage, and lower stage); however, an arrangement mode of the water tanks 1 is not limited thereto, and various arrangement modes can be implemented. Each water tank 1 is provided with the drainage device described with respect to FIG. 2.

An air inlet/outlet pipe 40 is provided in a horizontal state in an upper portion of the water tanks 1 on each stage, and air from an air pump 5 (corresponding to an air supply unit) is fed via an air supply pipe 45 arranged vertically. The air inlet/outlet pipe 40 is connected to the air supply pipe 45 by a joint 46. The air inlet/outlet pipe 40 is provided with a first valve body 41 and a second valve body 42. When air is fed to the drainage device, the air from the air pump 5 flows into the drainage device when opening the first valve body 41. The outside (left side in the drawing) of the second valve body 42 is opened to the atmosphere, and air in the drainage device can be released to the atmosphere when opening the second valve body 42.

The air inlet/outlet pipe 40 and the second connection portion 30b are connected to a one-way cock 43 via a vertical pipe 44. By controlling the air pump 5, the first valve body 41, and the second valve body 42, the second connection portion 30b of the siphon mechanism 2 can be selectively connected to the air pump 5 or the atmosphere. For example, by opening the first valve body 41 and closing the second valve body 42, air can be fed from the air pump 5 into the cylindrical portion 30 of the siphon mechanism 2. By closing the first valve body 41 and opening the second valve body 42, air inside the cylindrical portion 30 can be released to the atmosphere. As the vertical pipe 44, for example, an air tube having flexibility can be used.

A flow channel from the air pump 5 to the second connection portion 30b through the first valve body 41 corresponds to a first flow channel, and a flow channel from the second valve body 42 communicating with the atmosphere to the second connection portion 30b corresponds to a second flow channel.

Note that, although it is required to constantly supply air (oxygen) to each water tank 1, this also is performed by the air pump 5. Piping from the air pump 5 can be branched to supply air to the siphon mechanism and supply air into the water tank. Alternatively, a configuration of separate independent piping with one air pump 5 may be used, or separate air pumps may be used.

As illustrated in FIG. 3, water that flows into the overflow pipe 3 falls from the opening 3b at the lower end of the overflow pipe 3. As indicated by arrow 8, the fallen water enters the opening 3a of the overflow pipe 3 immediately below. Therefore, an attachment not illustrated is provided as a flow channel for connecting the opening 3b of the overflow pipe 3 on the upper stage to the opening 3a of the overflow pipe 3 on the middle side. This attachment is detachable. Note that, a size of a diameter is set so that the attachment does not hinder an inflow of the water from the opening 3a.

A similar attachment is provided also in a case where water falls from the overflow pipe 3 on the middle stage to the overflow pipe 3 on the lower stage. The water that falls from the overflow pipe 3 on the lower stage will be described with reference to FIGS. 4 and 5. Note that, a flow channel configuration of the water discharged from the overflow pipe 3 is not limited to the above, and another embodiment can also be adopted. For example, it is possible to configure that the water can be collected in a drainage pipe arranged horizontally.

Single Filtration System

FIG. 4 illustrates a configuration of a water supply system of the single filtration system. Although the drainage system described with reference to FIG. 3 is used, illustration thereof is omitted for convenience of description. Since the water in the water tank 1 becomes contaminated, a mechanism for filtering the water is required; in the single filtration system, a filtration device is used for each water tank 1. Note that, a well-known filtration device can be used, and illustration and description thereof are omitted.

A water storage tank 6 is arranged in an upper portion of the furniture. Water (breeding water) is supplied from the water storage tank 6 to each water tank 1. A float valve 6a is provided in the water storage tank 6, and this operates to close a valve body 66 (corresponding to a water storage tank valve body) when the water becomes full. The water storage tank 6 is provided with the valve body 66 and a manual valve 67, and tap water is supplied from an upstream side via the valve body 66 in general. When the valve body 66 cannot be used due to a failure or the like, the manual valve 67 may be operated to supply water.

First horizontal piping 61 (three locations) and second horizontal piping 60 (one location) are arranged in an upper portion of each stage of the furniture. The first horizontal piping 61 and second horizontal piping 60 are connected to vertical piping 62 (two locations) on right and left sides thereof. A valve body 63 (corresponding to a water supply valve body) and a manual valve 64 are provided on left and right sides of the first horizontal piping 61, respectively. A valve body 65 is provided in each water tank 1. Normally, when opening the valve body 63, the water is supplied from the water storage tank 6 to each water tank 1. When the valve body 63 cannot be used due to a failure or the like, the manual valve 64 may be operated to supply the water. Opening and closure of the valve body 63 and the valve bodies 65 and 66 are controlled by the control unit 100.

The water fallen from the overflow pipe 3 of the water tank 1 on the lower stage is collected by a horizontally arranged drainage pipe 80 to be sent to a drainage path not illustrated by a collection pipe 68. The collection pipe 68 is provided with a sensor to detect an amount of water that passes therethrough. An oblique cut 68a is formed on the collection pipe 68 so that the amount of water can be easily detected. This sensor can detect a drainage state (start and end).

FIG. 4A is a control block diagram. The control unit 100 is formed of a computer and software as a core. The control unit 100 controls the first valve body 41 and the second valve body 42 in order to control a drainage work. This also controls the valve body 63, the valve body 65, and the valve body 66 in order to control a water supply work.

Figure 12:
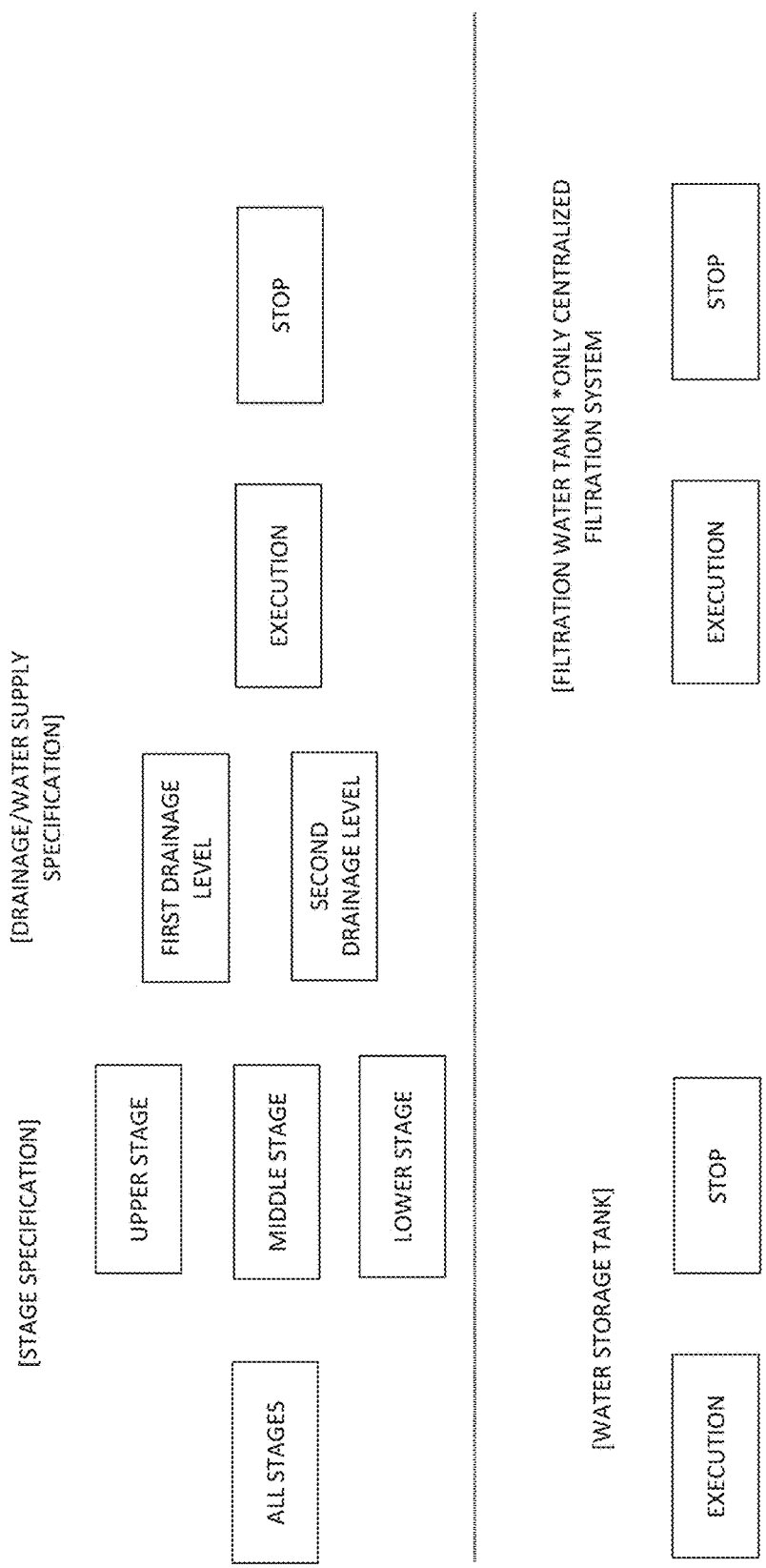
FIG. 12 is a diagram schematically illustrating an operation screen of an operation panel.

An instruction for drainage and water supply is issued via an operation panel 101. FIG. 12 is a diagram conceptually illustrating an operation screen of the operation panel 101. In a case where the drainage is performed, it is possible to set the water tank 1 installed in the furniture in which the drainage is performed. When an "all stages" button is selected, the water tanks 1 on all the upper, middle, and lower stages in FIG. 3 can be drained. There also is a button for selecting the upper stage, the middle stage, and the lower stage, and for example, the water tanks 1 on only the upper stage or only the upper and middle stages of the water tank 1 can be drained. As another embodiment, a configuration in which each water tank 1 can be selected to be drained may be adopted.

When the drainage is performed, it is also possible to select whether to set a first drainage level or a second drainage level. The drainage level is described later in detail. An "execution" button is an operation unit for starting the drainage operation. A "stop" button is an operation unit for starting the drainage operation.

An "execution" button and a "stop" button for storing the water in the water storage tank 6 are provided. Furthermore, an "execution" button and a "stop" button for starting an operation of a filtration water tank 7 are provided in a case of the centralized filtration system to be described later. A forced stop can be performed by the "stop" button in a case where some abnormality occurs during the work.

Centralized Filtration System

FIG. 5 illustrates a configuration of a water supply system of the centralized filtration system. Although the drainage system described with reference to FIG. 3 is used, illustration thereof is omitted for convenience of description. A configuration regarding the water storage tank arranged in the upper portion of the furniture is the same as that in FIG. 3. The filtration water tank 7 is arranged in a lower portion of the furniture, and water filtered by the filtration water tank 7 is supplied to each water tank 1. Therefore, each water tank 1 is not provided with a filtration device.

A float valve 7a is provided in the filtration water tank 7, and this closes a valve body 76 (corresponding to a water storage tank valve body) when the water becomes full. The water storage tank 6 is connected to the filtration water tank 7 with vertical piping 70. The valve body 76 is provided, and water is supplied to the filtration water tank 7 by opening the valve body 76. When the valve body 76 cannot be used due to failure or the like, the manual valve 77 is operated to supply the water. Each valve body illustrated in FIG. 5 is controlled by a control unit.

Water supply from the filtration water tank 7 to each water tank 1 is performed by horizontal piping 73 and vertical piping 72. The water is supplied to each water tank 1 by a water supply pump 71 by opening a valve body 75 (corresponding to a water supply valve body). Each water tank 1 is provided with a water supply valve 74, and the water is supplied into the water tank. Water drained by the drainage device in each water tank 1 is fed again to the filtration water tank 7 via the overflow pipe 3 provided in each water tank 1, and is supplied again to each water tank 1 in a filtered state. In this manner, the water is used in circulation while being filtered. Note that, in a case where the water circulates, the water overflowed from the overflow pipe 3 of the drainage device returns to the filtration water tank 7. Movement of the water from the upper stage to the middle stage and from the middle stage to the lower stage is performed along arrow 8 by the attachment not illustrated as described above.

The water fallen from the overflow pipe 3 of the water tank 1 on the lower stage is collected by the piping 80 in the horizontal direction to be returned to the filtration water tank 7 by piping 81 in the vertical direction. The water returned to the filtration water tank 7 is filtered and then sent again to each water tank 1 by the water supply pump 71.

When the water is discharged by the siphon mechanism 2, the valve body 75 of the vertical piping 72 is closed. In this case, the water sent by the water supply pump 71 with the valve body 72 opened is returned to the filtration water tank 7 via the valve body 72. The valve body 72 is closed in a normal use state.

An outlet 78 is provided in the filtration water tank 7. In a case where the water is discharged by the siphon mechanism 2 of each water tank 1, a large amount of drainage flows into the filtration water tank 7, so that overflowed water is discharged from the outlet 78.

FIG. 5A is a control block diagram. The control unit 100 is formed of a computer and software as a core. The control unit 100 controls the first valve body 41 and the second valve body 42 in order to control a drainage work. This also controls the valve body 72, the valve body 75, the valve body 76, and the valve body 66 in order to control the water supply work.

Drainage Action

Next, actions of the drainage device and the drainage system described with reference to FIGS. 2, 3, and 6 will be described. In the present embodiment, in a case where the water in the water tank 1 is discharged for replacement, a drainage amount can be set to two stages (first drainage level and second drainage level).

Figure 8A:
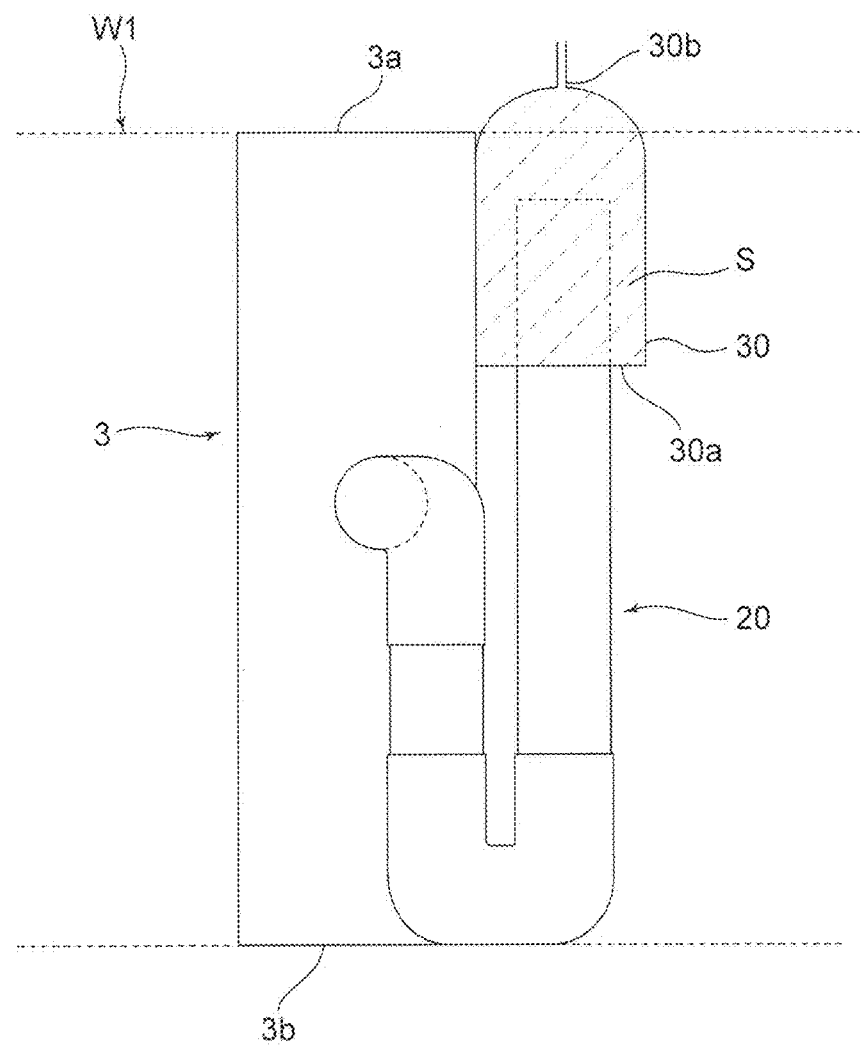
FIG. 8A is a diagram for illustrating an action of the siphon mechanism at a first drainage level.
Figure 8B:
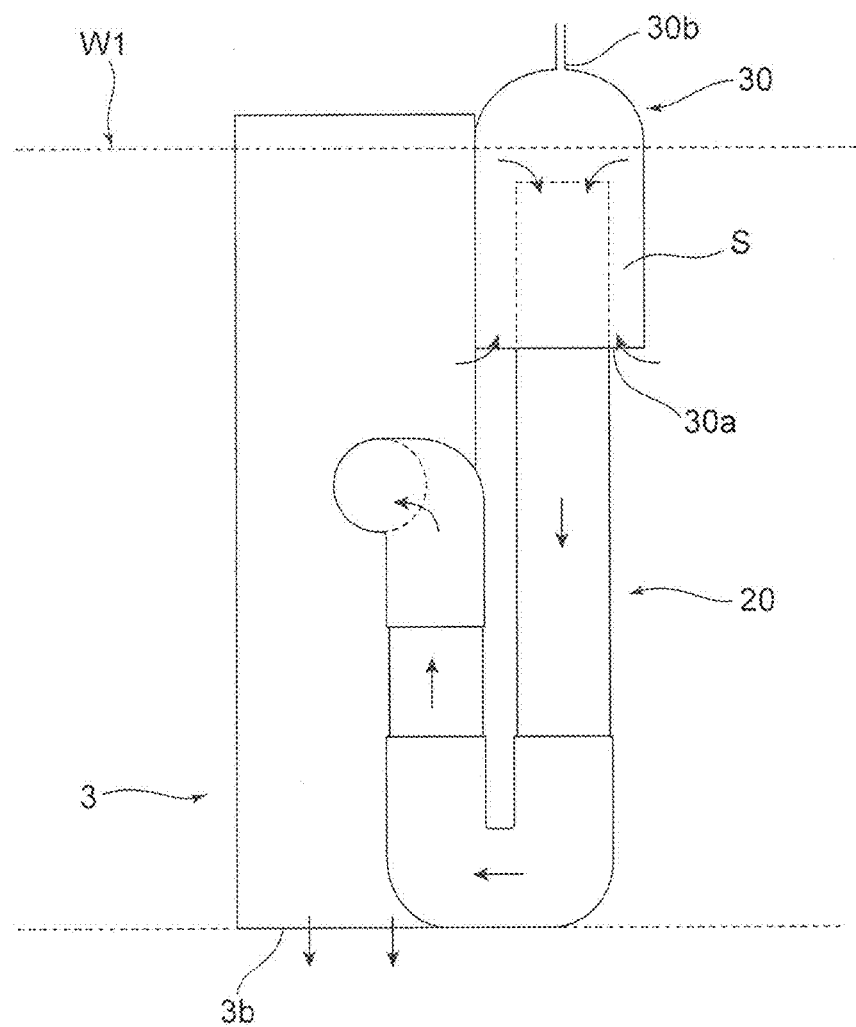
FIG. 8B is a diagram for illustrating an action of the siphon mechanism at the first drainage level.

FIGS. 8A to 8D are diagrams for illustrating an action of the siphon mechanism at the first drainage level. In a state in which the siphon mechanism is not operated (drainage by water replacement is not performed), the first valve body 41 is opened and the second valve body 42 is closed in FIG. 3. Then, air is fed to the siphon mechanism 2 of each water tank 1 by the air pump 5. As illustrated in FIG. 8A, air enters up to a position of the opening 30a of the cylindrical portion 30. A region which air enters is indicated by an oblique broken line. Air enters the gap S, and a siphon action by the siphon mechanism 2 is not performed. In this state, a water surface W1 is located at the opening 3a at the upper end of the overflow pipe 3. The control on the first valve body 41 and the second valve body 42 is performed by the control unit 100 including a computer as a core (refer to FIG. 4A).

In order to put the inside of the cylindrical portion 30 into a state in which an air pressure is constantly applied, the siphon pipe is formed into a U shape to be connected to the overflow pipe 3 at the central portion of the overflow pipe 3. As a result, water is constantly stored in the U-shaped portion including the U-shaped pipe portion 22, so that the air pressure can be applied in a stable state.

Drainage Operation at First Drainage Level (Single Filtration System)

First, the drainage operation in the single filtration system illustrated in FIG. 4 will be described with reference to a flowchart in FIG. 11A. To start the drainage operation, the "execution" button of the operation panel 101 is operated. As a result, the siphon mechanism 3 is activated, and the first valve body 41 is closed (S11) and the second valve body 42 is opened (S12). A time interval between step S11 and step S12 can be appropriately set. As a result, the second connection portion 30b of the cylindrical portion 30 is connected to the atmosphere, and the air in the cylindrical portion 30 is pushed out. As a result, the water in the water tank 1 enters the cylindrical portion 30 from the gap S as indicated by arrows in FIGS. 8B and 8D, and the siphon action starts. The water that enters the gap S further enters the siphon pipe 20 and moves into the overflow pipe 3. As a result, the water surface W1 is gradually lowered, and the drainage action progresses. Note that, steps S11 and S12 may be performed simultaneously.

Figure 8C:
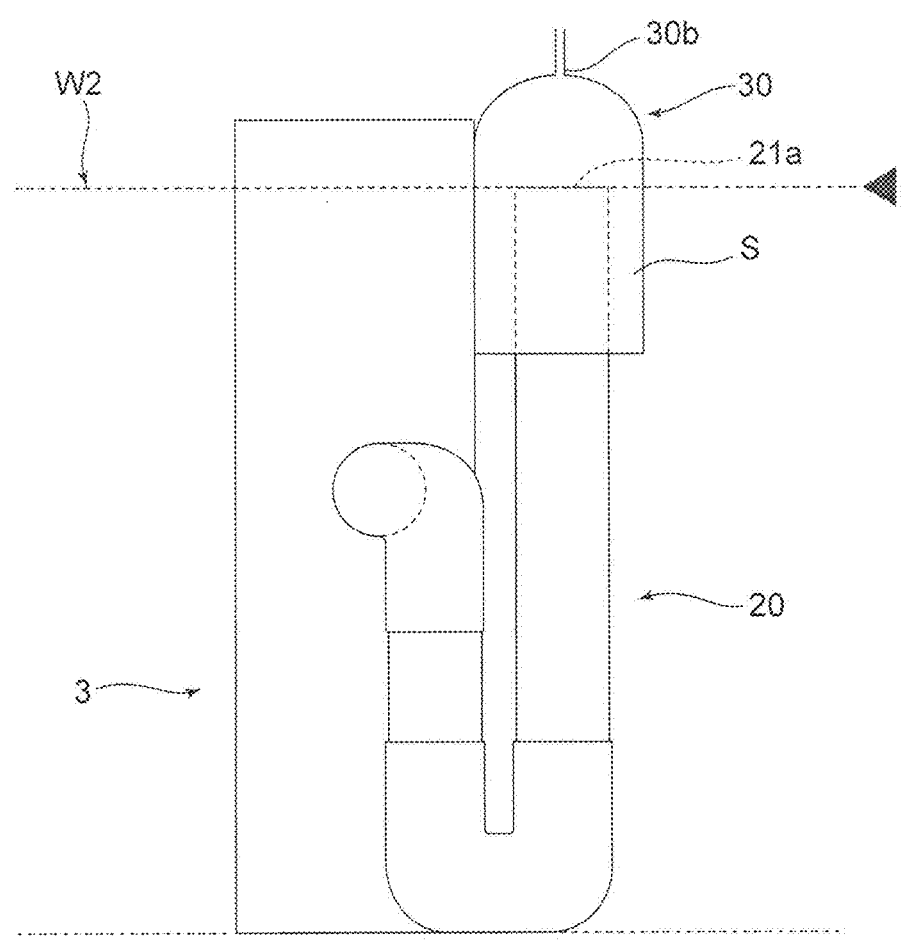
FIG. 8C is a diagram for illustrating an action of the siphon mechanism at the first drainage level.
Figure 8D:
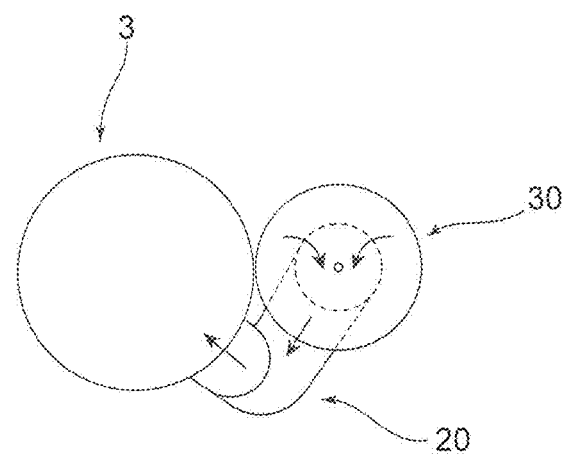
FIG. 8D is a diagram for illustrating an action of the siphon mechanism at the first drainage level.

As illustrated in FIG. 8C, when a water surface W2 is lowered to a height of the first opening 21a of the siphon pipe 20, the siphon action ends, and the drainage operation is completed. Note that, since the second connection portion 30b remains open to the atmosphere, the air exists up to a position of the first opening 21a.

The completion of the drainage operation is determined based on whether a first predetermined time has elapsed based on a timer function of the control unit 100 (S20). The first predetermined time can be set and stored in advance in consideration of a time in which the water surface W2 is lowered to the height of the first opening 21a. The first predetermined time is set as an elapsed time from the instruction by the operation panel 101 or step S11.

After the lapse of the first predetermined time, in order to start a subsequent water supply operation, the second valve body 41 is closed (S22), and then the first valve body 41 is opened (S23). A time interval between step S22 and step S23 can be appropriately set. Note that, steps S22 and S23 may be performed simultaneously.

Drainage Operation at Second Drainage Level (Single Filtration System)

First, the drainage operation in the single filtration system illustrated in FIG. 4 will be described with reference to a flowchart in FIG. 11B.

Figure 9A:
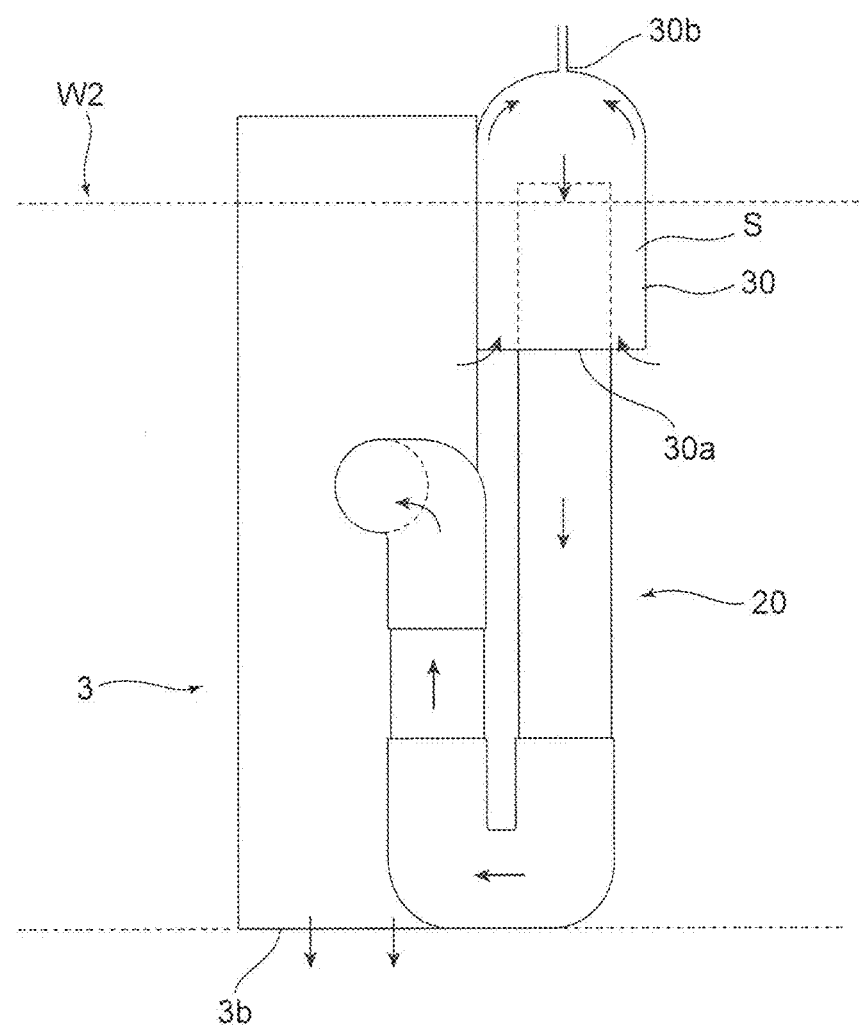
FIG. 9A is a diagram for illustrating an action of the siphon mechanism at a second drainage level.
Figure 9B:
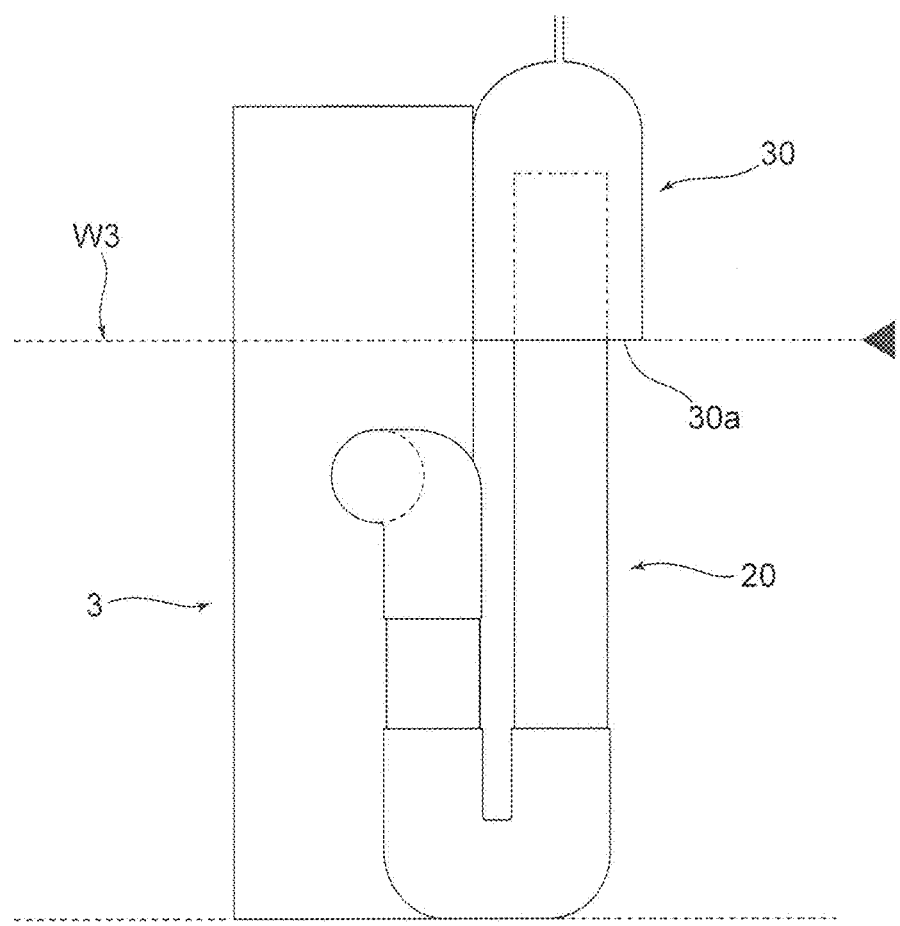
FIG. 9B is a diagram for illustrating an action of the siphon mechanism at the second drainage level.

FIGS. 9A and 9B are diagrams for illustrating an action of the siphon mechanism 2 at the second drainage level. A state in which the siphon mechanism 2 is not operated is as described above.

When the siphon mechanism 2 is allowed to act, first, the first valve body 41 is closed (S11), and the second valve body 42 is opened (S12). It is heretofore the same as the description with reference to FIG. 8. The air in the cylindrical portion 30 is released to the atmosphere, and water enters the cylindrical portion 30 via the gap S. As a result, the water surface W2 is gradually lowered. When it reaches a state in which the cylindrical portion 30 is filled with water, the second valve body 42 is switched from open to close (S14).

A timing of switching the second valve body 42 from open to close is performed based on whether a second predetermined time has elapsed based on a timer function of the control unit 100 (S13). The second predetermined time can be set and stored in advance in consideration of a time in which it reaches the state in which the cylindrical portion 30 is filled with water. When the second predetermined time has elapsed, the second valve body 42 is closed.

As illustrated in FIG. 9B, when a water surface W3 is lowered to a position of the second opening 30a at the lower end of the cylindrical portion 30, air enters the cylindrical portion 30 from the second opening 30a, so that the drainage action by the siphon action ends. When the drainage action is completed, the first valve body 41 is opened (S22). A timing of opening the first valve body 41 is determined based on whether a third predetermined time has elapsed after step S14 (S20).

The third predetermined time can be set and stored in advance in consideration of a time in which the water surface W3 is lowered to the position of the second opening 30a.

As described above, the drainage can be performed at two levels. A worker can select the level at which the drainage is performed via the operation panel 101. Regarding the start of the drainage work, the drainage can be started after checking a degree of contamination of the water in the water tank and the like.

The drainage work for water replacement may be automatically performed periodically by using the timer function. A period of time for starting the drainage may be set in advance, and the drainage may be automatically started when the time comes. The setting can be changed for each stage. A type of the drainage may be selected by creating a computer program in advance.

Drainage Operation at First Drainage Level
(Centralized Filtration System)

Next, the drainage operation at the first drainage level in the centralized filtration system will be described with reference to a flowchart in FIG. 11C.

In a case of the centralized filtration system, prior to the control on the first valve body 41 and the second valve body 42, the valve body 72 is opened (S1), and then the valve body 75 is closed (S2). This is for preventing water supply to each water tank 1 during the drainage operation. Note that, steps S1 and S2 may be performed simultaneously.

Figure 11A:
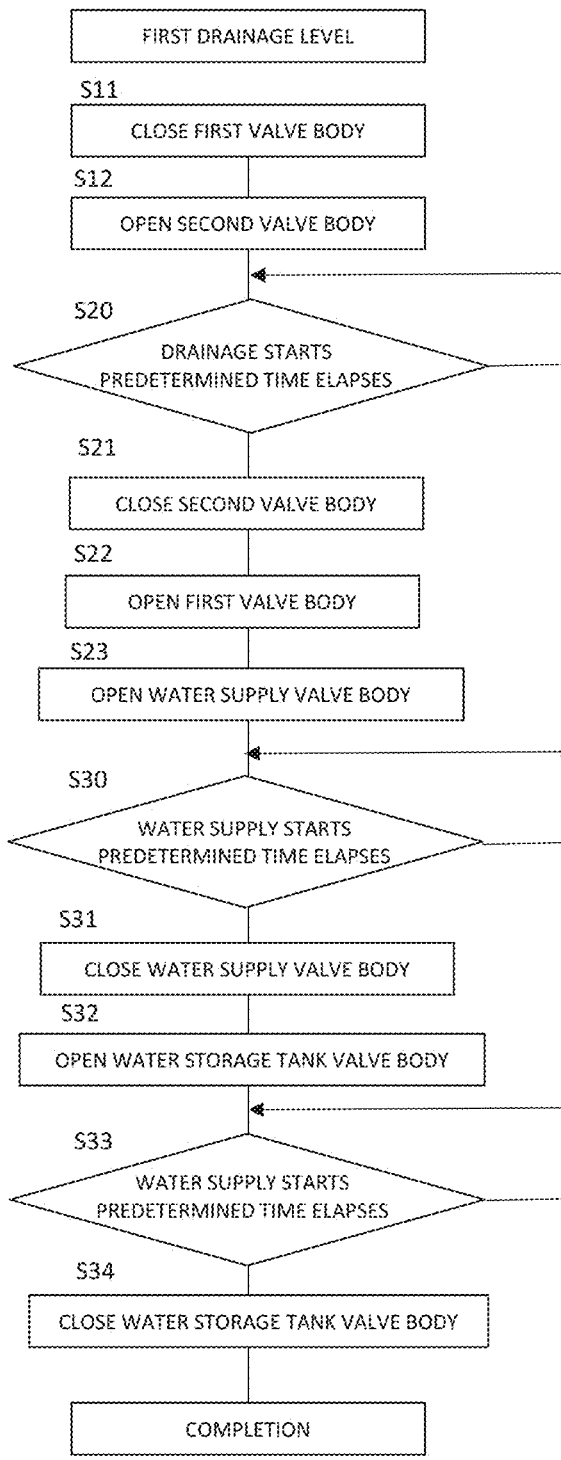
FIG. 11A is a flowchart illustrating a drainage operation in a single filtration system (first drainage level).

Thereafter, the drainage operation is actually performed; steps S11 to S22 are the same as those in a case of FIG. 11A, so that the description thereof is omitted.

Drainage Operation at Second Drainage Level
(Single Filtration System)

Next, the drainage operation at the second drainage level in the centralized filtration system will be described with reference to a flowchart in FIG. 11D.

Figure 11B:
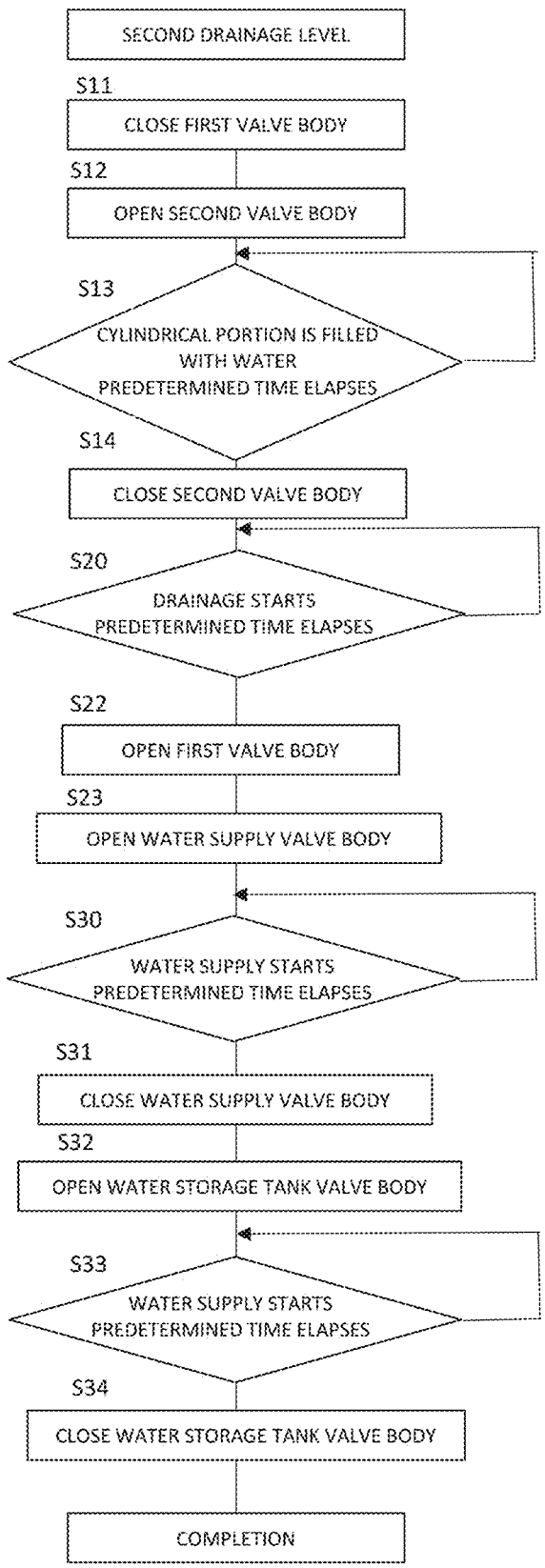
FIG. 11B is a flowchart illustrating a drainage operation in a single filtration system (second drainage level).
Figure 11C:
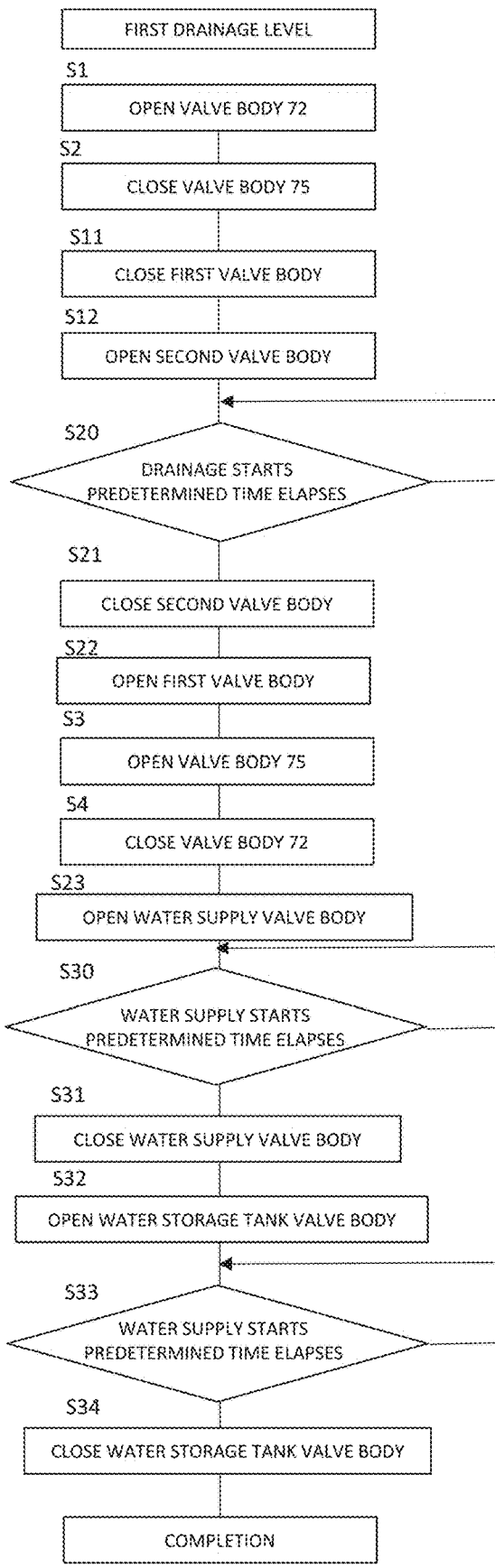
FIG. 11C is a flowchart illustrating a drainage operation in a centralized filtration system (first drainage level).

Steps S1 and S2 are the same as those in FIG. 11C. Steps S11 and S22 are the same as those in FIG. 11B. Therefore, description thereof is omitted.

Water Supply Action

Next, the water supply operation after the drainage operation is finished will be described. The water supply operation is automatically started after the drainage operation is completed.

Water Supply Operation at First Drainage Level
(Single Filtration System)

The water supply operation at the first drainage level is illustrated in the flowchart in FIG. 11A already described in the drainage operation. After the first valve body 41 is opened at step S22, the water supply valve body (valve body 63) is opened (S23). Accordingly, water supply to the selected water tank 1 is started. After a lapse of a fourth predetermined time (S30), the water supply valve body is closed (S31), and the water supply to the water tank 1 is finished. Note that, the fourth predetermined time can be set and stored in advance in consideration of a time when the water supply is completed.

After the water supply to the water tank 1 is completed, the water is supplied to the water storage tank 6. First, the water storage tank valve body (valve body 66) is opened (S32). Accordingly, the water supply to the water storage tank 6 is started. After a lapse of a fifth predetermined time (S33), the water storage tank valve body is closed (S34), and the water supply to the water storage tank 6 is completed. As described above, the water supply to the water tank 1 and the water supply to the water storage tank 6 after the drainage operation is completed are also automatically performed. The same applies to the contents to be described below.

Water Supply Operation at Second Drainage Level
(Single Filtration System)

The water supply operation at the second drainage level is illustrated in the flowchart in FIG. 11B already described in the drainage operation. Since steps S23 to S34 are the same as those in a case of FIG. 11A, description thereof is omitted.

Water Supply Operation at First Drainage Level
(Centralized Filtration System)

The water supply operation at the first drainage level is illustrated in the flowchart in FIG. 11C already described in the drainage operation. After the first valve body 41 is opened at step S22, the valve body 75 (water supply valve body) is opened (S3), and then the valve body 72 is closed (S4). As a result, water can be supplied from the filtration water tank 7 to each water tank 1. Note that, steps S3 and S4 may be performed simultaneously. Since steps S23 to S34 after step S4 are the same as those in FIGS. 11A and 11B, description thereof is omitted.

Water Supply Operation at Second Drainage Level
(Centralized Filtration System)

Figure 11D:
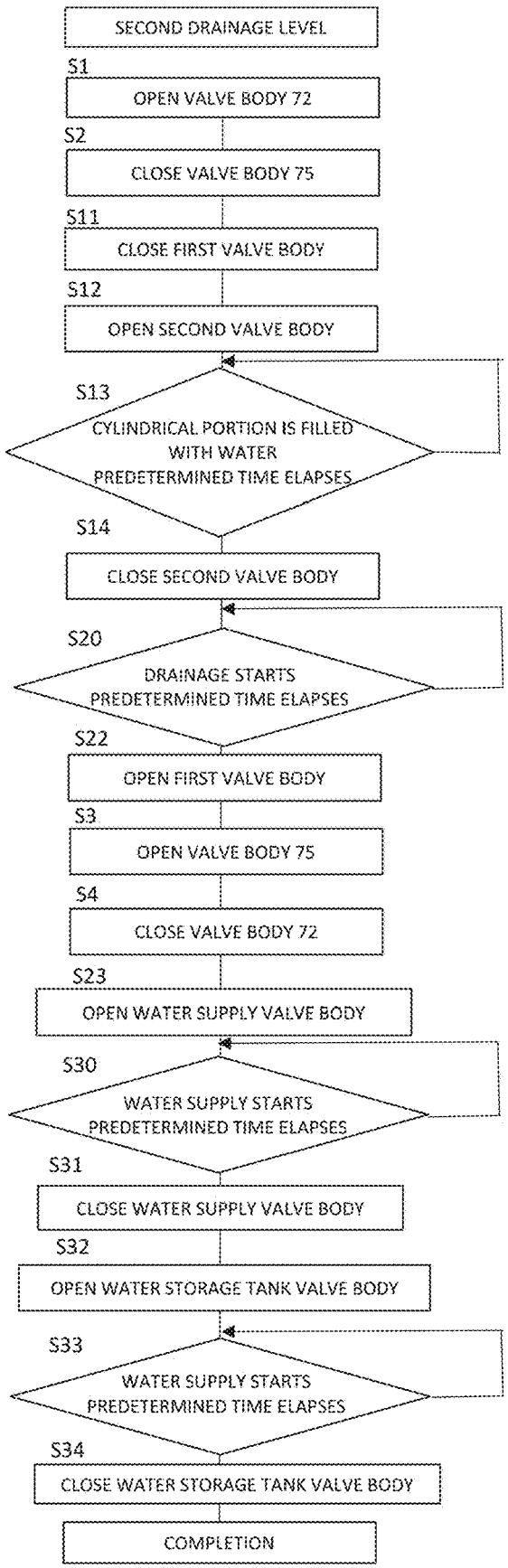
FIG. 11D is a flowchart illustrating a drainage operation in a centralized filtration system (second drainage level).

The water supply operation at the second drainage level is illustrated in the flowchart in FIG. 11D already described in the drainage operation. Steps S1 and S2 are the same as those in a case of FIG. 11C. Steps S11 to S22 are the same as those in a case of FIG. 11B. Steps S3, S4, and S23 to 34 are the same as those in a case of FIG. 11C. Therefore, description thereof is omitted.

Another Embodiment of End of Water Supply Operation

The end of the water supply operation may be detected based on, for example, a sensor provided in the collection pipe 68 illustrated in FIG. 4. That is, when the water supply to the water tank 1 continues, the overflowed water enters from the opening 3a of the overflow pipe 3, so that the end of the water supply can be detected by detecting the amount of water. In addition, the water supply can be stopped by a method of detecting the end based on the time from the water supply start or by providing a float valve in each water tank 1.

When the water supply to each water tank 1 is finished, the tap water is supplied to the water storage tank 6 as described above, but a configuration in which the valve body 66 is closed by the float valve 6a when the water tank is filled with water may be adopted.

Another Embodiment

The valve body installed at each place in the present embodiment is formed of, for example, an electromagnetic valve, so that it is possible to automatically control to close or open on the basis of an instruction signal.

It is preferable to provide a check valve before the air pump 5 or before the first valve body 41 so that the air does not flow back from the air inlet/outlet pipe 40 to the air pump 5 due to a power failure or the like due to an unexpected trouble.

In the present embodiment, the discharge operation of the water tank 1 is controlled for each stage, but it is also possible to prevent the water in a specific water tank 1 from being replaced. Therefore, by making it possible to close the one-way cock 43 for each water tank, the drainage can be stopped while maintaining the air pressure in the cylindrical portion 30. The water supply valve 65 is also closed for the water tank 1 in which the drainage is not performed so that water is not supplied. The one-way cock 43 may be closed manually, or an electromagnetic valve may be adopted instead of the one-way cock 43 so as to be automatically controlled by the control unit 100.

Contrary to the above, the water replacement can be performed only for the specific water tank 1. For example, when water replacement is manually performed, the following procedure is performed. First, the one-way cock 43 is closed. The siphon pipe 20 integrally coupled with the overflow pipe 3 is configured to be detachable from the water tank 1, and by pulling this out, the drainage can be performed. On the other hand, since the one-way cock 43 is closed, another water tank 1 does not start drainage unintentionally. It is necessary to supply water after the drainage work is finished; in this case, the water supply valve is closed for the water tank 1 in which water replacement is not performed, and the manual valve bypassed to the water storage tank is opened, so that water can be supplied to a specific water tank via the bypass. However, an unintended drainage operation might start. Therefore, it is preferable to provide a check valve adjacent to the air pump 5 and the first valve body 41.

Figure 10:
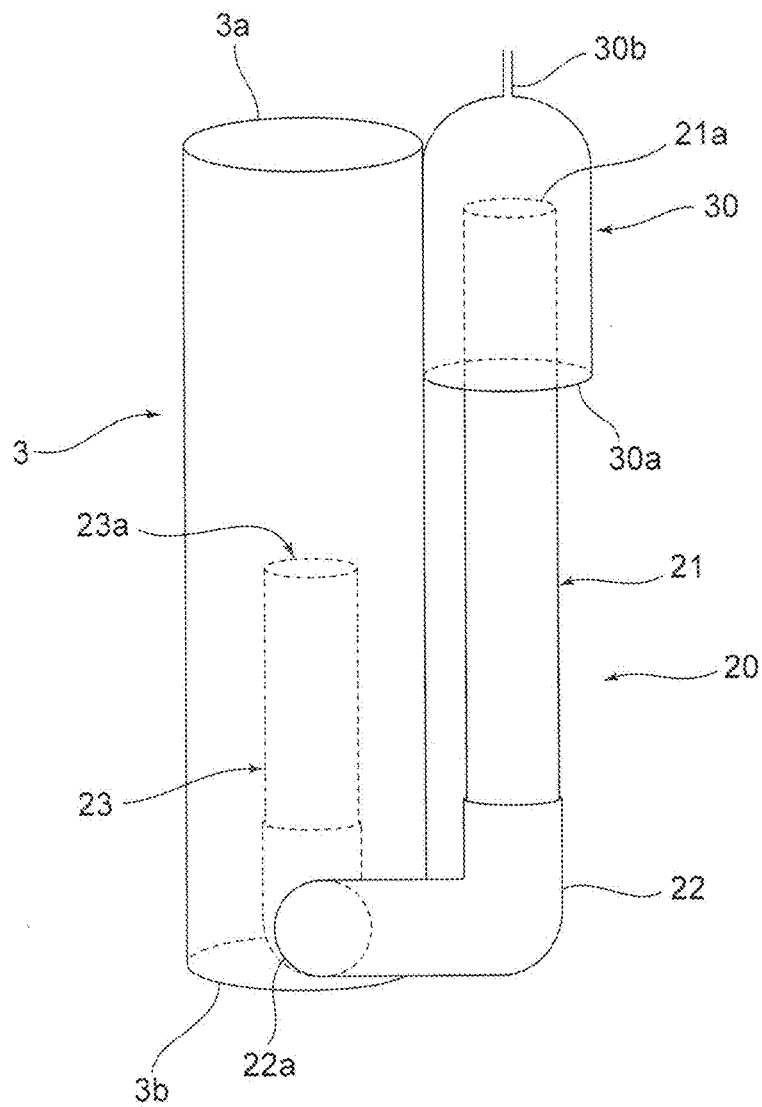
FIG. 10 is a schematic perspective view illustrating a siphon mechanism according to another embodiment.

FIG. 10 is a diagram illustrating a siphon mechanism according to another embodiment. Members having the same functions as those of the embodiment illustrated in FIG. 6 are denoted by the same reference numerals. A part of the U-shaped pipe portion 22 enters the overflow pipe 3, and the first connection portion 22a is provided in the middle thereof. The second vertical pipe portion 23 is inserted in the overflow pipe 3, and an opening 23a at an upper end thereof faces the overflow pipe 3.

In the present embodiment, the air pump is taken as an example of the air supply unit, but the present invention is not limited thereto, and another actuator or the like may be used.

Although the operation panel is illustrated in FIG. 12, the operation unit may be a touch button or a mechanical button. The operation may be performed by a terminal connected wirelessly such as Wi-Fi.

DESCRIPTION OF REFERENCE SIGNS

1 Water tank
2 Siphon mechanism
20 Siphon pipe
21 First vertical pipe portion
21a First opening
22 U-shaped pipe portion
23 Second vertical pipe portion
24 Connection pipe portion
24a First connection portion
3 Overflow pipe
3a Opening
3b Opening
30 Cylindrical portion
30a Second opening
30b Second connection portion
40 Air inlet/outlet pipe
41 First valve body
42 Second valve body
43 One-way cock
44 Vertical pipe
45 Air supply pipe
5 Air pump
6 Water storage tank
63 Valve body (water supply valve body)
66 Valve body (water storage tank valve body)
7 Filtration water tank
72 Valve body
75 Valve body (water supply valve body)
76 Valve body
100 Control unit
101 Operation panel
S Gap

The invention claimed is:

1. A drainage device provided inside a water tank, and including a siphon mechanism formed of a siphon pipe and a cylindrical portion, the drainage device comprising:
the siphon pipe including a first opening an upper portion of which is opened on one end side, and including a first connection portion connected to an overflow pipe on the other end side; and
the cylindrical portion having an inner diameter larger than the siphon pipe, and having a second opening a lower portion of which is opened and into which the first opening of the siphon pipe is inserted, the second opening set in a position lower than the first opening,
wherein a second connection portion for selectively connecting an inside of the cylindrical portion to an air supply unit or atmosphere is provided on an upper surface of the cylindrical portion.

2. The drainage device according to claim 1, wherein the siphon pipe is formed into a shape of a U-shaped pipe.

3. A drainage system comprising:
the drainage device according to claim 1;
the air supply unit;
a first flow channel that connects the air supply unit to the second connection portion via a first valve body;
a second flow channel that connects atmosphere to the second connection portion via a second valve body; and
a control unit that controls the first valve body and the second valve body.

4. The drainage system according to claim 3, wherein in a state in which a drainage operation is not performed, the control unit opens the first valve body and closes the second valve body, and allows air to flow in to a position of the second opening inside the cylindrical portion by the air supply unit.

5. The drainage system according to claim 3, wherein in a state in which the drainage operation is performed, the control unit closes the first valve body, opens the second valve body, and releases the air inside the cylindrical portion to the atmosphere to allow the siphon mechanism to perform drainage.

6. The drainage system according to claim 3, wherein in a state in which the drainage operation is performed, the control unit closes the first valve body, opens the second valve body, releases the air inside the cylindrical portion to the atmosphere, and then closes the second valve body again to allow the siphon mechanism to perform drainage.

7. A drainage system comprising:
the drainage device according to claim 1;
an operation unit for instructing the drainage device to start drainage;
a first flow channel that connects the air supply unit to the second connection portion via a first valve body;
a second flow channel that connects atmosphere to the second connection portion via a second valve body; and
a control unit that controls the first valve body and the second valve body, wherein the control unit closes the first valve body and opens the second valve body to operate the siphon mechanism to start a drainage operation based on an instruction by the operation unit, and closes the second valve body and opens the first valve body after a lapse of a first predetermined time to finish the drainage operation.

8. A drainage system comprising:

the drainage device according to claim 1;

an operation unit for instructing the drainage device to start drainage;

a first flow channel that connects the air supply unit to the second connection portion via a first valve body;

a second flow channel that connects atmosphere to the second connection portion via a second valve body; and a control unit that controls the first valve body and the second valve body, wherein the control unit closes the first valve body and opens the second valve body to operate the siphon mechanism to start a drainage operation based on an instruction by the operation unit, and closes the second valve body after a lapse of a second predetermined time and opens the first valve body after a lapse of a third predetermined time after the closure to finish the drainage operation.

9. The drainage system according to claim 7, wherein the control unit opens a water supply valve body for starting water supply to the water tank after the drainage operation is finished.

10. The drainage system according to claim 9, wherein the control unit closes the water supply valve body after a lapse of a fourth predetermined time after the water supply is started.

11. The drainage system according to any one of claim 7, wherein a plurality of water tanks is installed, and a selection unit capable of selecting a water tank in which the drainage operation is started is provided.

12. The drainage system according to claim 10, wherein the control unit controls a water storage tank valve body that stores water in a water storage tank for supplying water to the water tank, and opens the water storage tank valve body along with the closure of the water supply valve body, and closes the water storage tank valve body after a lapse of a fifth predetermined time.

13. The drainage system according to claim 8, wherein the control unit opens a water supply valve body for starting water supply to the water tank after the drainage operation is finished.

14. The drainage system according to claim 13, wherein the control unit closes the water supply valve body after a lapse of a fourth predetermined time after the water supply is started.

* * * * *